United States Patent [19]

Fershko et al.

[11] E Patent Number: Re. 33,515

[45] Reissued Date of Patent: Jan. 8, 1991

[54] GRAVITY FEED DISPLAY DEVICE

[75] Inventors: Jane S. Fershko, Toronto, Canada; Robert W. Lackey, Hickory, N.C.

[73] Assignee: The Mead Corporation, Dayton, Ohio

[21] Appl. No.: 400,149

[22] Filed: Aug. 29, 1989

Related U.S. Patent Documents

Reissue of:

[64] Patent No.: 4,690,287
Issued: Sep. 1, 1987
Appl. No.: 853,938
Filed: Apr. 21, 1986

U.S. Applications:

[63] Continuation of Ser. No. 557,851, Dec. 5, 1983, Pat. No. 4,593,823.

[51] Int. Cl.[5] ..... A47F 7/00
[52] U.S. Cl. ..... 211/49.1; 211/128
[58] Field of Search ..... 211/49.1, 133, 128, 211/186, 188, 189, 194; 312/42; 248/544, DIG. 9; 206/602, 634; 220/23.8, 23.4

[56] References Cited

U.S. PATENT DOCUMENTS

| | | | |
|---|---|---|---|
| 2,091,126 | 8/1937 | Speer | 206/602 X |
| 2,884,155 | 4/1959 | Hanson | 206/602 X |
| 2,955,736 | 10/1960 | Annen, Sr. | 206/602 X |
| 3,968,881 | 7/1976 | Beil et al. | 211/128 |
| 3,970,199 | 7/1976 | Marschak | 211/128 |
| 3,983,999 | 10/1976 | Morton | 206/602 |
| 4,441,615 | 4/1984 | Goodrich | 211/126 X |

*Primary Examiner*—Sarah A. Lechok
*Attorney, Agent, or Firm*—Rodgers & Rodgers

[57] ABSTRACT

For providing double gravity feed type shelving for use in conjunction with refrigerated article display units, a gravity feed shelf unit is provided and comprises a main chute structure arranged to be inclined so as to feed articles in the direction of inclination thereof and supplementary chute structure disposed alongside said main chute structure and similarly inclined so as to feed articles in the direction of inclination thereof, the supplementary chute structure being detachable so as to reduce the transverse dimension of the shelving structure if need be, the shelf units being specially adapted for interchangeable mounting one above the other whereby a single shelf in a refrigerated display unit is adapted for use as a double shelf display.

4 Claims, 4 Drawing Sheets

GRAVITY FEED DISPLAY DEVICE

Matter enclosed in heavy brackets [ ] appears in the original patent but forms no part of this reissue specification; matter printed in italics indicates the additions made by reissue.

This is a continuation of application Ser. No. 557,851, now U.S. Pat. No. 4,593,823, filed Dec. 5, 1983.

TECHNICAL FIELD

This invention relates to gravity feed shelving units primarily but not exclusively for use in refrigerated displays and which are specially constructed so as to accommodate different transverse cabinet dimensions and which are interchangeably mountable one atop the other so as to increase the shelf capacity of display cabinets.

BACKGROUND ART

U.S. Pat. No. 4,314,648 issued Feb. 9, 1982 and assigned to the assignee of this invention discloses a gravity feed shelf for use in a display device which is not refrigerated and which is formed of a plurality of similarly constructed channel like chutes assembled together on a display shelf.

DISCLOSURE OF THE INVENTION

According to this invention in one form, a specially constructed gravity feed type shelf unit is arranged for disposition in spaced relation above another similarly constructed shelf unit, each unit comprising gravity feed type main chute structure to the side edges of which supplementary chute structure is detachably mounted so as to render the device adaptable to accommodate various space requirements such as are to be found in refrigerated display cabinets commonly used in supermarkets, the shelf units being formed preferably by an injection molding procedure.

BEST MODE OF CARRYING OUT THE INVENTION

Figure 1:
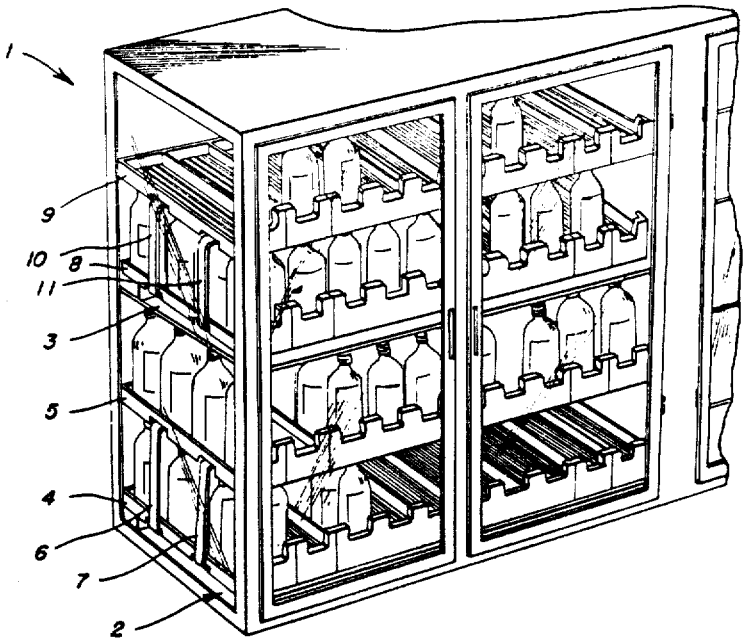
FIG. 1 is a perspective view of a refrigerated cabinet in which a plurality of gravity feed shelf units formed according to this invention are disposed.

In FIG. 1 a refrigerated cabinet is generally designated by the numeral 1 and includes a base shelf generally designated at 2 and a second shelf generally designated at 3. Shelves 2 and 3 are horizontally disposed as is the usual practice in connection with displays of this type.

In order to convert shelf 2 into a gravity feed structure and also to enhance its capacity, a gravity feed shelf unit 4 is provided according to this invention and a second gravity feed shelf unit 5 is disposed in spaced relation above shelf unit 4. Support for gravity feed shelf unit 5 is afforded by brackets 6 and 7 and by a pair of similar brackets disposed at the right hand end of shelf units 4 and 5 but which are not observable in FIG. 1.

Similarly a pair of gravity feed shelf units 8 and 9 are mounted on the shelf 3, gravity feed shelf unit 9 being supported by brackets 10 and 11 and by similar brackets at the right hand end of the structure which are not observable in FIG. 1. Since shelf units 4, 5, 8 and 9 are of identical construction, shelf units hereinafter will be designated as S and S1 and the brackets such as 6, 7, 10 and 11 will hereinafter be designated as B1 and B2.

Figure 2:
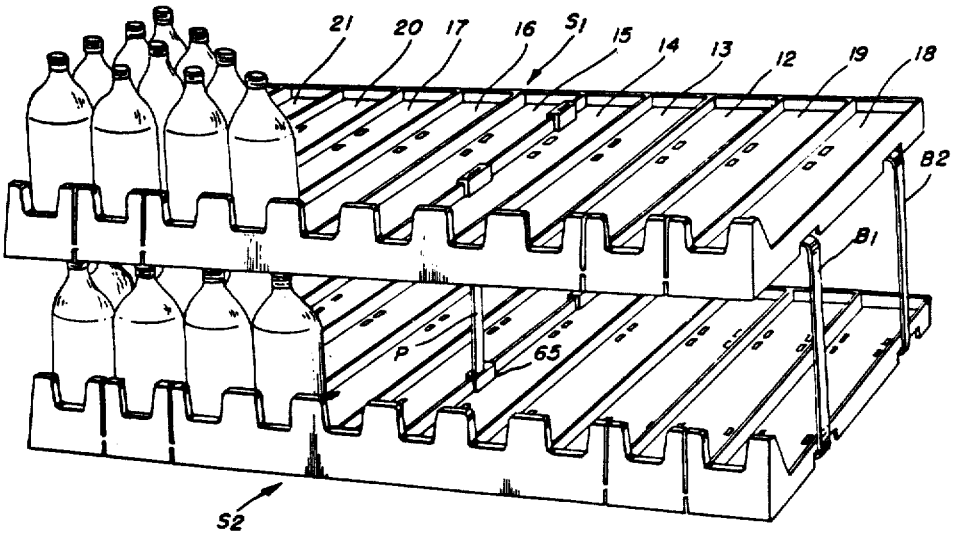
FIG. 2 is a perspective view of a pair of gravity feed shelf units arranged with one unit mounted in spaced relation above another unit so as to provide two tiers of units which conveniently may be mounted on a single shelf of a refrigerated cabinet where dimensional relationships between the size of articles to be displayed and the refrigerated cabinet are properly interrelated.

As is apparent from FIG. 2 a plurality of chutes designated 12–17 inclusive form the mid portion of shelf unit S1 and are hereinafter referred to as the main chute structure since these chutes are integrally formed and constitute a single unitary structure. Supplementary chute structure is detachably secured to each side edge of the main chute structure and comprises supplementary chutes 18 and 19 on one side of the main chute structure and supplementary chutes 20 and 21 on the opposite side which are detachably secured to the opposite side of the main chute structure. The supplementary chutes are detachably secured to the main chute structure as well as to each other and by this means the shelf unit formed according to this invention is rendered readily adaptable for use in space environments which vary in their transverse dimensions.

Figure 3:
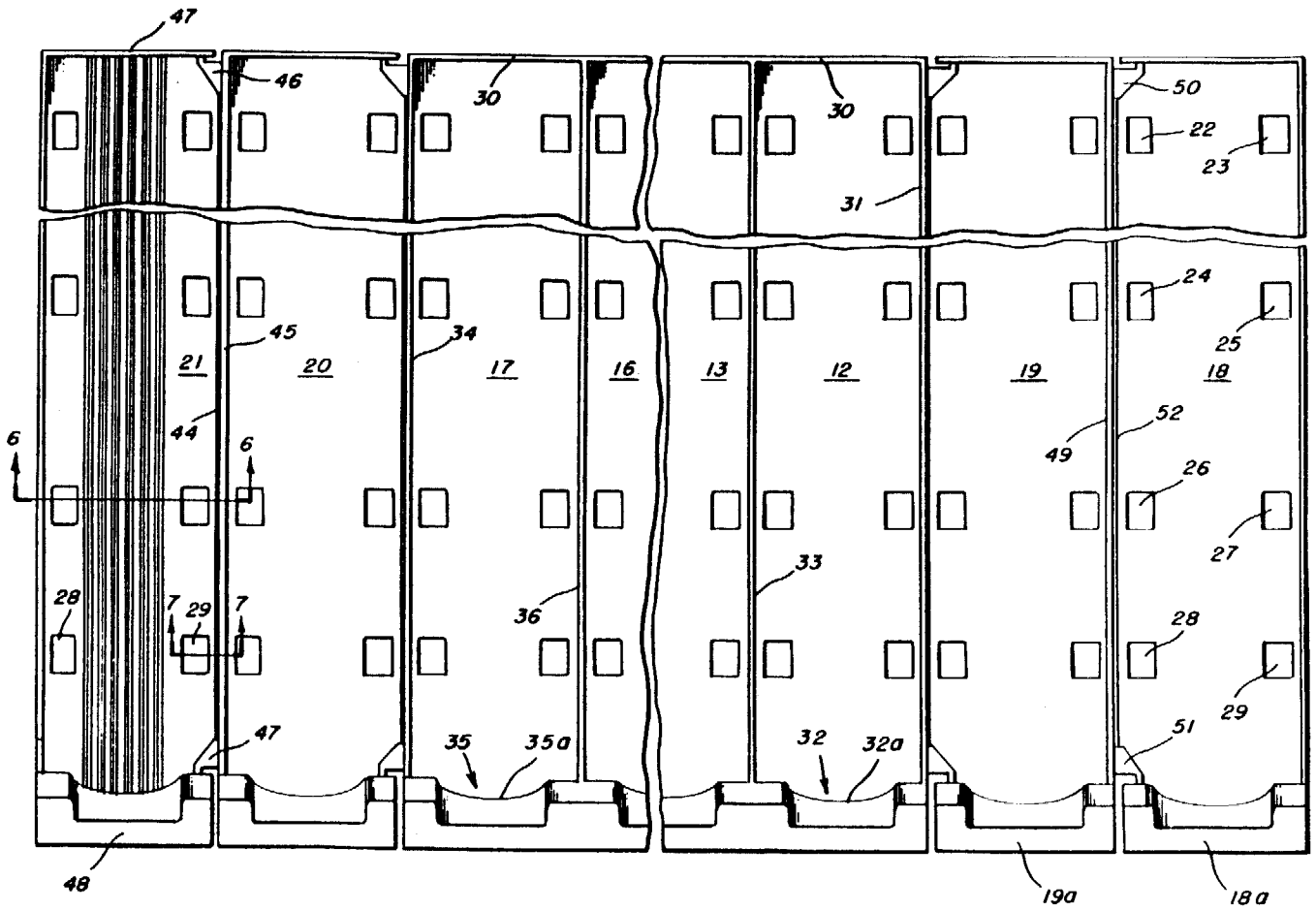
FIG. 3 is a plan view from above of a gravity feed shelf unit formed according to this invention.

In order to conserve space, chutes 14 and 15 as well as parts of chutes 13 and 16 are cutaway from FIG. 3.

Since the shelf unit formed according to this invention is primarily intended for use within refrigerated enclosures, each chute is provided with ventilating apertures which are arranged in identical fashion in each of the chutes and are identified on chute 18, for example, by the numerals 22–29 inclusive.

Main chute structure comprising chutes 12–17 inclusive includes a common back wall identified by the numeral 30. Chute 12 includes a side wall 31, a front bumper wall 32 and an opposite side wall 33. As is obvious wall 33 is a common wall separating chutes 12 and 13. In like fashion chute 17 includes a side wall 34, a front bumper wall 35 and a side wall 36 which as is obvious is a common wall separating chutes 16 and 17. From the description thus far it should be apparent that chutes 13, 14, 15 and 16 are provided with wall structure identical to that just described in connection with chutes 12 and 17.

In order to provide maximum visibility of the displayed articles, front walls such as 32 and 35 in all of the chutes are cutaway as is indicated at 32a and 35a.

Figure 6:
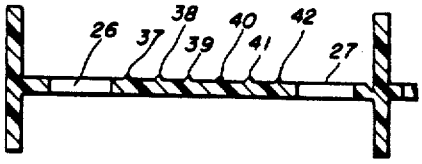
FIG. 6 is an enlarged cross sectional view taken along the line designated 6—6 in FIG. 3.

For the purpose of reducing friction between the slide surfaces of the various chutes and the bottom surfaces of the articles being displayed, a plurality of ribs such as are designated by the numerals 37–42 inclusive in FIG. 6 are provided. It will be understood that various numbers of ribs may be employed as may be desired in particular instances.

Figure 7:
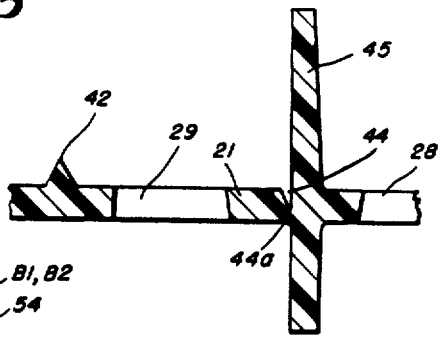
FIG. 7 is an enlarged cross sectional view taken along the line 7—7 in FIG. 3.

In order to reduce the size of the shelf unit as shown in FIG. 3, a chute such as is designated at 21 may be removed. As is best shown in FIG. 7, a groove 44 to define a weakened severance line 44a is formed in the top surface of chute 21 immediately adjacent the side wall 45 of chute 20. Thus downward bending chute 21 effects a rupture of the frangible weakened severance line structure 44a which interconnects the slide plate of chute 21 with the wall structure 45. Added support for chute 21 is in the form of frangible means comprising frangible tabs 46 and 47a. As is apparent from the drawing, tab 46 is interconnected to end wall 47 of chute 21 and is also connected with side wall 45 of chute 20. In like fashion tab 47a is interconnected with front wall 48 of chute 21 and to the side wall 45 of chute 20. Tabs 46 and 47a may simply be ruptured by adequate finger or tool pressure and thereafter the chute 21 may be folded downwardly relative to chute 20 so as to fracture the weakened severance line 44a. When this occurs of course chute 21 may be discarded and the result is a reduction in the transverse dimension of the shelf structure.

Figure 5:
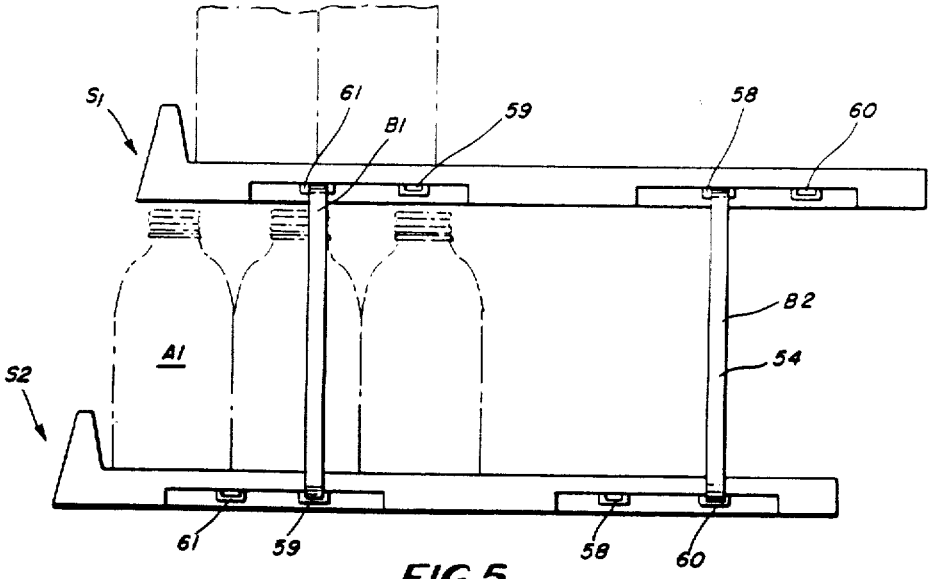
FIG. 5 is an end view of a pair of gravity feed shelf units arranged one atop another so as to provide a two-tiered support structure.
Figure 11:
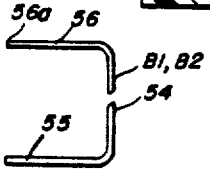
FIG. 11 is a side view of a bracket formed according to one aspect of the invention.
Figure 8:
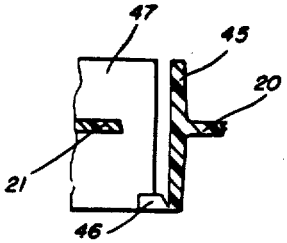
FIG. 8 is an enlarged cross sectional view taken along the line designated 8—8 in FIG. 4.

Since chute 18 is interconnected with side wall 49 of chute 19 by means of tabs 50 and 51 and by the weakened severance line at the bottom of groove 52 it is obvious that downward folding of chute 18 following rupture of tabs 50 and 51 results in severance of chute 18 from chute 19 along the weakened severance line structure which interconnects these two chutes at the bottom portions thereof. In like fashion it is obvious that chutes 19 and 20 may be detached from their adjacent chutes 12 and 17 in a manner identical to that described in conjunction with chutes 18 and 21 and the overall effect is to reduce the transverse dimension of the shelf unit such as is shown in FIG. 2 for example from ten chutes to six chutes should all of the removable chutes 18, 19, 20 and 21 be removed. Of course one or more of these removable chutes may be detached as is desired. The invention is not limited to any particular number of chutes as is obvious. For mounting one shelf unit such as S1 atop another identical shelf unit such as S2 as shown in FIGS. 2 and 5, brackets such as B1 and B2 are employed together with support pedestals such as P are employed. Brackets B1 and B2 are of identical construction and are C-shaped in form as shown in detail in FIG. 11. These brackets include a vertical portion 54 and a lower horizontal portion 55 and an upper horizontal portion 56.

As is apparent from FIG. 5 brackets B1 and B2 may be mounted in either one of two alternate positions. As shown in FIG. 5 bracket B2 is arranged with its upper horizontal part 56 disposed within transverse aligned guide means 58 formed on the bottom surface of all of the chutes so that when bracket B2 is fully inserted its upper portion 56 extends completely across chutes 18, 19 and partially across chute 12. The horizontal bottom portion 55 of bracket B2 is inserted into transverse aligned guide passages 60 formed completely across the shelf unit shown in FIGS. 3 and 4.

In like fashion the upper portion 56 of bracket B1 is disposed within the transverse guide passage 61 while the lower horizontal portion 55 of bracket B1 is disposed within the transverse guide passage 59. As is obvious from FIG. 5, the effect of connecting the upper portions 56 of brackets B1 and B2 in the guide passages 58 and 61 and the insertion of the lower portion 55 of brackets B1 and B2 into the passages 59 and 60 effectively shifts the shelf S1 to the right as viewed in FIG. 5 relative to the lower shelf S2. Thus when the shelf is tilted, as it will be in normal use, in a generally counterclockwise direction so that the right hand portions of both units S1 and S2 are elevated relative to the left hand portions thereof, so that the article such as A1 in shelf S2 is readily accessible to and observable by a prospective purchaser. In the absence of such shifting of shelf S2 to the left relative to shelf S1 it is apparent that article A1 would tend to be hidden underneath the front portion of shelf S1 and access thereto would be limited.

Since the horizontal portion 56 of the brackets B1 and B2 is long enough to extend across the entire width of approximately three chutes, it is apparent that when all of the detachable chutes such as 18, 19, 20 and 21 are removed, the inner ends such as 56a of both brackets B1 and B2 are adjacent the inner end of the bracket from the other side of the shelf unit and by this means adequate support for the main chute structure is provided.

Figure 4:
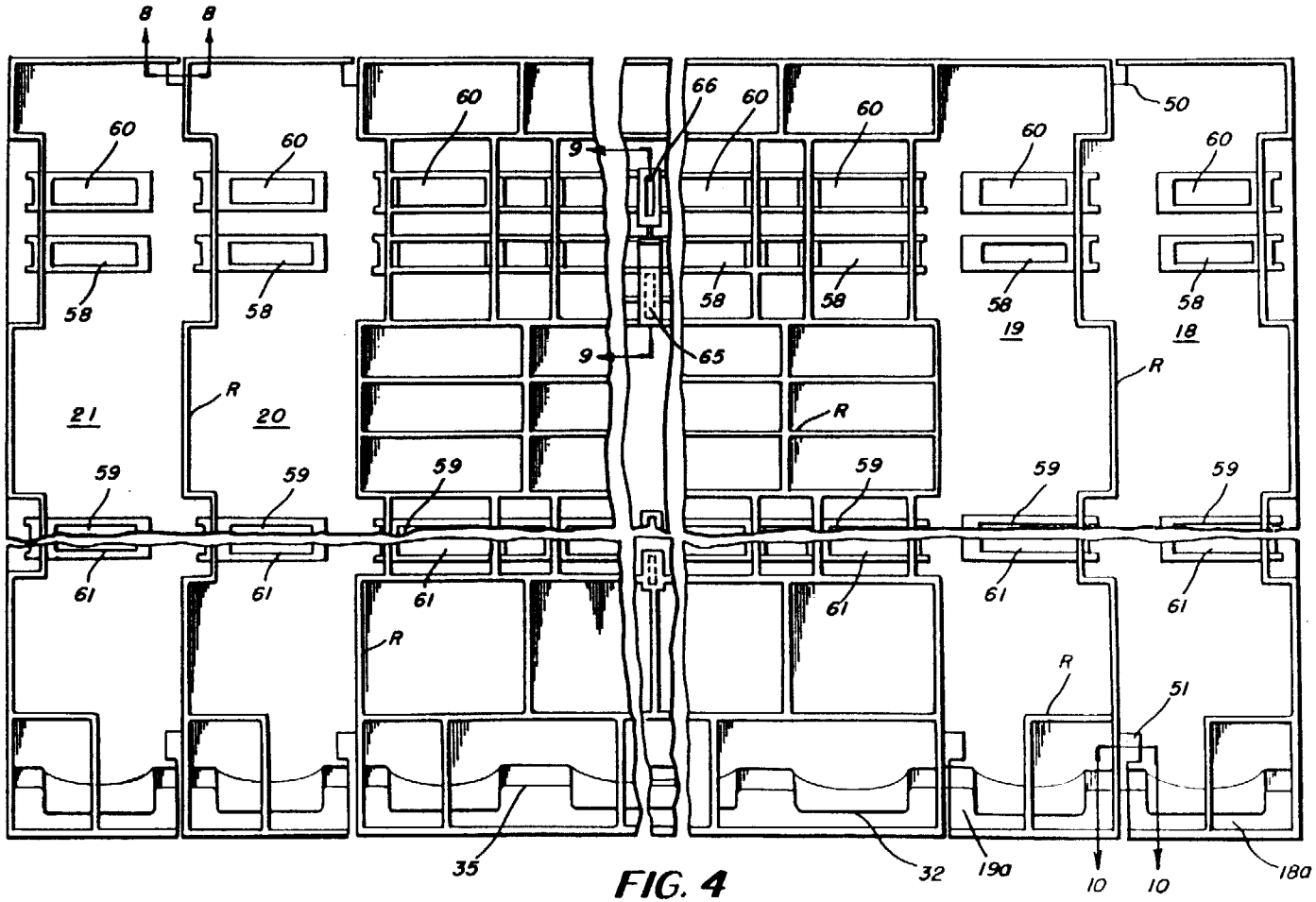
FIG. 4 is a view of a gravity feed shelf unit such as is shown in FIG. 3 but which is viewed from below.
Figure 9:
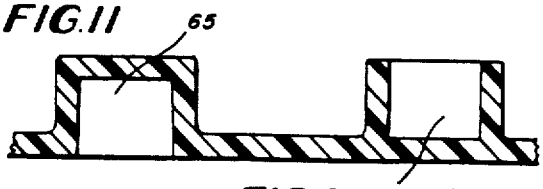
FIG. 9 is an enlarged cross sectional view taken along the line designated 9—9 in FIG. 4.
Figure 10:
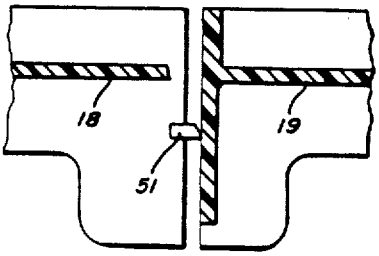
FIG. 10 is an enlarged cross sectional view taken along the line designated 10—10 in FIG. 4

On the other hand when all of the chutes including 18, 19, 20 and 21 are in use, the inner portion such as 56a of the upper horizontal part 56 of brackets B1 and B2 do not afford support for the intermediate chutes such as 13–16 inclusive and which comprise the main chute structure. In order properly to afford support for the mid portion of the main chute structure, a pair of pedestals are provided although only one such pedestal designated at P is observable for example in FIG. 2. In order to render the shelf units S1 and S2 readily adaptable for use interchangeably as either the upper or lower chute, anchoring wells designated by the numerals 65 and 66 are provided. Thus as seen in FIG. 9 and FIG. 4 which is a view from below, only the anchoring well 66 is observable whereas the anchoring well 65 is observable only in dotted lines. Anchoring well 65 is utilized to receive the lower end of pedestal P while anchoring well 66 receives the upper end of pedestal P since FIG. 4 is a view from below and the well 66 is accessible to receive the upper end of pedestal P. Thus according to this feature of the invention, the shelf units may be used interchangeably either as the upper unit S1 or the lower unit S2.

For tilting the shelf units forwardly in order to accomplish gravity feed, any suitable means may be used. For example, the refrigerator shelves such as 2 and 3 may be tilted or if desired a suitable spacer may be placed underneath the rear edge of the lower shelf S2.

For providing structural strength to all of the chutes, a number of transverse and longitudinal ribs are formed on the lower surface of the shelf structure. These ribs are shown in detail on FIG. 4. Due to the great number of ribs, these are not individually identified by reference numerals, it being deemed sufficient simply to indicate these ribs at random by the letter R.

One advantage achieved by this invention centers around the fact that the structure as shown for example in FIGS. 3 and 4 may be formed by injection moulding as a unitary structure.

In order to facilitate reduction of friction, and for the purpose of simplicity, the entire unit may be formed of plastic material intermixed with some known lubricant which effectively aids in reducing friction between the ribs formed in the slide surfaces of the chutes and the bottoms of the articles displayed.

INDUSTRIAL APPLICABILITY

This invention is particularly well adapted for use in conjunction with refrigerated display stands used in retail outlets and is especially desirable because it facilitates the conversion of conventional refrigerated cabinets into gravity feed devices and also enhances the capacity of such devices.

We claim:

1. A gravity feed shelf unit comprising a main chute structure including a pair of side walls and arranged to be inclined so as to feed articles in the direction of inclination thereof, a supplementary chute structure disposed alongside said main chute structure and including a slide plate and an outer side wall integral with said slide plate and spaced from one side wall of said main chute structure, one wall of said pair of side walls constituting an inner side wall of said supplementary chute structure, a front bumper, and a rear wall and similarly inclined so as to feed articles in the direction of inclination thereof, frangible means including a first frangible tab interconnecting said bumper and said one side wall of said main chute structure and a second frangible tab interconnecting said rear wall of said supplementary chute structure and said one side wall of said main chute structure, and a weakened severance line interconnecting lower portions of said main and said supplemental chute structures and arranged to attach said supplementary chute structure to said main chute structure.

2. A gravity feed shelf unit comprising a main chute structure having side walls and arranged to be inclined so as to feed articles in the direction of inclination thereof, supplementary chute structure including a plurality of supplementary chutes disposed along each side of said main chute structure and similarly inclined so as to feed articles in the direction of inclination thereof, each of said supplementary chute structures including a slide plate, a front bumper, a rear wall and an outer side wall, the side walls of said main chute structure constituting the inner walls of the adjacent supplementary chute structure, and the outer side wall of a supplementary chute structure forming the inner side wall of an adjacent supplementary chute structure, and the slide plates of outer ones of said supplementary chutes being interconnected with adjacent parts of the adjacent inner chute by weakened severance means, and frangible means including a first frangible tab interconnecting each of said front bumpers and the side wall of the adjacent inner chute structure, and a second frangible tab interconnecting each of said rear walls of said supplementary chute structures and the side wall of the adjacent inner chute structure.

*3. A gravity feed shelf unit comprising a main chute structure including a pair of side walls and arranged to be inclined so as to feed articles in the direction of inclination thereof, a supplementary chute structure disposed alongside said main chute structure and including a slide plate and an outer side wall integral with said slide plate and spaced from one side wall of said main chute structure, one wall of said pair of side walls constituting an inner side wall of said supplementary chute structure, said supplementary chute structure being similarly inclined so as to feed articles in the direction of inclination thereof, frangible means including a frangible tab interconnecting said rear wall of said supplementary chute structure and said one side wall of said main chute structure, and a weakened severance line interconnecting lower portions of adjacent parts of said main and said supplementary chute structures whereby said supplementary chute structure is detachably secured to said main chute structure.*

*4. A gravity feed shelf unit comprising a main chute structure having side walls and arranged to be inclined so as to feed articles in the direction of inclination thereof, supplementary chute structure including a plurality of supplementary chutes disposed along at least one side of said main chute structure and similarly inclined so as to feed articles in the direction of inclination thereof, each of said supplementary chute structures including a slide plate, an end wall at the front and rear thereof and an outer side wall, a side wall of said main chute structure constituting the inner wall of the adjacent supplementary chute structure, and the outer side wall of a supplementary chute structure forming the inner side wall of an adjacent supplementary chute structure, and the slide plates of outer ones of said supplementary chute structures being interconnected with adjacent parts of the adjacent inner supplementary chute structure and the inner one of said supplementary chute structures being interconnected with the adjacent side of said main chute structure by weakened severance means, and frangible means interconnecting an end wall of each outer supplementary chute structure with the adjacent side wall of an adjacent inner supplementary chute structure and interconnecting a side wall of said main chute structure and an end wall of the adjacent supplementary chute structure.*

* * * * *